Patented July 28, 1925.

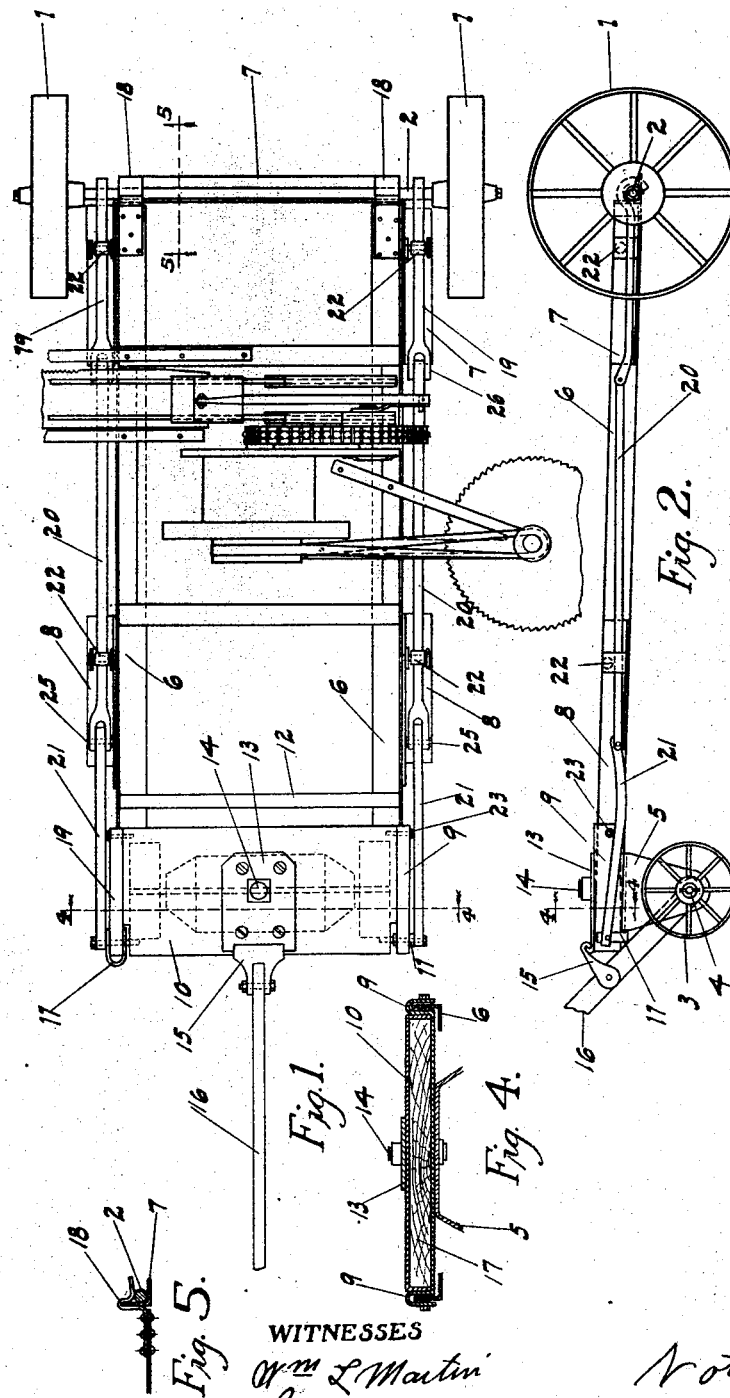

1,547,770

UNITED STATES PATENT OFFICE.

NOTLEY MADDOX, OF LOS ANGELES, CALIFORNIA.

ADJUSTABLE LIFTING TRUCK.

Application filed April 28, 1924. Serial No. 709,588.

*To all whom it may concern:*

Be it known that I, NOTLEY MADDOX, a citizen of the United States, residing at Los Angeles, in the county of Los Angeles and State of California, have invented a new and useful Adjustable Lifting Truck, of which the following is a specification.

My invention relates to improvements in adjustable lifting trucks where a combination of parts co-functioning as fulcrums and levers perform the operation of lifting objects from a low level of rest to a convenient height for making them transportable.

The main object of this device is the use to which it will be applied as a truck in transporting an adjustable sawing machine from one place to another, which must of necessity for the various uses to which it is subject have an adjustment in height from different grade levels upon which it operates.

For example in the cutting of timber land, the sawing machine, in order to be moved quickly from a tree after it begins to fall, must be mounted upon something transportable to insure a proper means of escape from injury in case the tree should bounce or kick back or loose branches break off from entanglement with other trees in close proximity, the common practice being now to attach the sawing machine to the tree as well as staking it to the ground, during the process of sawing. By the application of the sawing machine to an adjustable truck of this description these difficulties are readily overcome.

Many other uses may also be ascribed to the use of a truck of this character, which will be quite apparent during the course of the following description.

In the accompanying drawing forming a part of this application and in which like numerals are employed to designate like parts throughout the same—

Fig. 1 is a plan view of the truck showing the adjustable sawing machine mounted thereon and which as stated before is the primary use for which the truck is intended.

Fig. 2 is a side elevation of the truck, showing the adjustable sawing machine removed.

Fig. 3 is a side elevation of the truck in its collapsable position.

Fig. 4 is a section taken on line 4—4 of Fig. 1.

Fig. 5 is a section taken on line 5—5 of Fig. 1.

In the drawing, the side angle irons 6 extending along each side constitute the main side members of the truck body and are held in place at the rear by angle iron 7 which is bent so as to run across the back and part way along the sides where it is riveted to side angle iron 6. The side angle irons 6 are fastened in front to the platform side plates 9 which are held rigidly in place by the platform 10 and pivoted at the bolts 23. The platform side plates are made in the form of an inverted U, Fig. 4, so as to straddle the angle irons 6 when the truck is in its elevated position as shown in Fig. 2. The stirrups 11 which are fastened by the bolts 24 swing over the front ends of angle irons 6 and lock the truck frame in its elevated position. Between the platform plates is a wood filler 17.

The front axle 4 is supported by a bent axle plate 5 and is pivoted in the center of the platform 10 by means of a bolt 14. Upon the front axle are mounted the front wheels 3. The handle 16 is hinged at the center of the front axle 4 so that it will swing in a vertical plane and allow the hook 15 to engage with a hook plate 13 which is fastened rigidly to the platform 10. The rigidity of the truck frame is further insured by a stiffener 12 extending across the truck and fastened to the side angle irons 6.

The rear end of the truck is surmounted upon a rear axle 2 on which rear wheels 1 are mounted.

The front side irons 21 are fastened to the platform side plates 9 at the front end by the bolts 24 and to the center side irons 20 at the other end by the pins 25. The rear side irons 19 are fastened at their front end to the center side irons 20 by the pins 26 and at the rear end are bent to form a hook to grasp the rear axle 2. These side arms or operating levers are the co-functioning parts which govern the raising and lowering of the truck.

The front side arms are supported by the angle irons 8 running parallel and fastening to the side angle irons 6.

Upon the side angle irons 8 and rear angle irons 7 are mounted rollers which serve as guides and bearing points for the center and rear side irons 20 and 19.

To the side angle irons 6 are riveted the axle seat plates 18 which bend over the angle iron 7 and extend back forming a recess in which the rear axle fits, when the truck is in its elevated position, Fig. 2.

To elevate the truck from the down position, Fig. 3, to the elevated position, Fig. 2, swing the handle 16 up and back until the hook 15 engages with a hook plate 13 and then swing it forward. The platform 10 with the hook plate 13, axle plate 5, stirrups 11, bolt 14 and the bolts 24 which are fastened to it directly and the front axle 4, wheels 3, handle 16 and the hook 15 which are fastened to it indirectly all move on a pivot as a single unit around the bolt 23 forcing the front part of the truck up, thru the pressure of the front wheels 3 upon the ground.

During the same operation of bringing the handle 16 forward the front, center and rear side irons 21, 20, and 19 respectively being pinned together by the pins 25 and 26 are all pulled forward by the bolts 24 which hold the front side irons 21 to the platform side plates 9 and they in turn pull the rear axle 2 with them, it being connected to the rear side irons 19 by the hooked ends.

When the rear side irons 19 are pulled forward the rear rollers 22, which are fastened to the angle iron 7, force the rear side irons 19 in a horizontal position lifting the rear of the truck to the same height as the front end, thereby bringing the rear axle 2 in the recess between the plates 18 and the angle iron 7.

The stirrups 11 are then swung down over the front ends of the angle irons 6 to prevent the platform 10 from swinging back to its position when the truck is down Fig. 3.

To lower the truck from its elevated position, Fig. 2, to its down position, Fig. 3, remove the stirrups 11 by swinging them upwards over the ends of the angle irons 6 and push the handle up against the front lower edge of the platform 10. The platform unit pivots on the bolts 23 forcing the front, center and rear side irons 21, 20 and 19, respectively, back and with them the rear axle 2, thus swinging the front wheels 3 forward and up allowing the front end of the truck to go down and pushing the rear wheels back allowing the rear end of the truck to go down.

Having thus described my invention, what I claim and wish to secure by Letters Patent are:

1. An adjustable lifting truck comprising a front platform mounted upon a front platform plate, an end and a pair of side angle irons, the side angle irons being pivotally hinged to the said platform plate connecting the forward ends of the truck frame and the platform plate being lipped over the said side angle irons in the form of a U, the said platform plate engaging a bent axle plate surmounted on a front axle, in combination with a front, center and rear side iron connecting the aforesaid platform plate and a rear axle which is pivotally hinged to, and adapted in raising and lowering, the truck frame through the medium of a hook engaging a hook plate fastened to the said front platform in cooperation with the movement of the side irons which impinge on rollers, and a means to lock the said arrangement in its elevated position, substantially as set forth.

2. An adjustable lifting truck comprising a front platform mounted upon a front platform plate, an end and a pair of horizontal side angle irons, the side angle irons being pivotally hinged to the said platform plate connecting the forward ends of the truck frame and the platform plate being lipped over in the form of a U and adapted to receive in its elevated position the said side angle irons, the said platform plate engaging a bent axle plate surmounted on a front axle, in combination with a front, center and rear side iron pivotally linked and connecting the aforesaid platform plate and a rear axle which is pivotally hinged to, and adapted in raising and lowering, the truck frame through the medium of a hook engaging a hook plate fastened to the said front platform in cooperation with the movement of the side irons which impinge on rollers, and a rear axle adapted to engage an axle seat in conjunction with a pair of stirrups which straddle the front end of the side frame angle irons to hold the aforesaid arrangement in its elevated position, substantially as set forth.

3. An adjustable lifting truck, comprising a front platform mounted upon a front platform plate, an end and a pair of horizontally adjustable side angle irons, the side angle irons being suitably braced and pivotally hinged to the said platform plate connecting the forward ends of the truck frame and the platform plate being lipped over the said side angle iron in the form of a U, the said platform plate engaging a bent axle plate surmounted on a front axle, in combination with a front, center and rear side iron connecting the aforesaid platform plate and a rear axle which is pivotally hinged to, and adapted in raising and lowering, the truck frame through the medium of a hook engaging a hook plate fastened to the said front platform in cooperation with the movement of the side irons which impinge on rollers pivoted to the side angle irons, the said arrangement being rigidly held in its elevated position by an apertured axle seat engaging a rear axle in conjunction with a pair of stirrups which straddle the front end of the side frame angle irons, substantially as set forth.

In testimony whereof I affix my signature.

NOTLEY MADDOX.

Witnesses:
 WM. L. MARTIN,
 E. WESSEL CLAUSLE.